(12) United States Patent
Haydn et al.

(10) Patent No.: US 10,751,667 B2
(45) Date of Patent: Aug. 25, 2020

(54) MEMBRANE ASSEMBLY WITH A BONDING LAYER

(71) Applicant: PLANSEE SE, Reutte (AT)

(72) Inventors: Markus Haydn, Reutte (AT); Stephan Hummel, Reutte (AT); Marco Brandner, Waltenhofen (DE)

(73) Assignee: Plansee SE, Reutte (AT)

( * ) Notice: Subject to any disclaimer, the term of this patent is extended or adjusted under 35 U.S.C. 154(b) by 156 days.

(21) Appl. No.: 16/064,606

(22) PCT Filed: Dec. 19, 2016

(86) PCT No.: PCT/AT2016/000102
§ 371 (c)(1),
(2) Date: Jun. 21, 2018

(87) PCT Pub. No.: WO2017/106886
PCT Pub. Date: Jun. 29, 2017

(65) Prior Publication Data
US 2019/0001275 A1      Jan. 3, 2019

(30) Foreign Application Priority Data
Dec. 21, 2015   (AT) .............. GM 377/2015

(51) Int. Cl.
*B01D 65/00* (2006.01)
*B01D 63/06* (2006.01)
(Continued)

(52) U.S. Cl.
CPC ......... *B01D 65/003* (2013.01); *B01D 63/065* (2013.01); *B01D 69/12* (2013.01);
(Continued)

(58) Field of Classification Search
CPC .. B01D 25/001; B01D 69/10; B01D 46/0001; B01D 2239/025; B01D 39/2068; B01D 46/2451; B01D 2239/083
See application file for complete search history.

(56) References Cited

U.S. PATENT DOCUMENTS 3,442,391 A * 5/1969 Bozek .................. B01D 17/045
                                                             210/457
5,162,987 A * 11/1992 Sambhu ................. G05B 11/26
                                                             318/599
(Continued)

FOREIGN PATENT DOCUMENTS

| JP | H07112111 A | 5/1995 |
|---|---|---|
| JP | 2003144859 A | 5/2003 |

(Continued)

*Primary Examiner* — Ana M Fortuna
(74) *Attorney, Agent, or Firm* — Laurence A. Greenberg; Werner H. Stemer; Ralph E. Locher

(57) ABSTRACT

A membrane assembly for the permeative separation of a fluid from fluid mixtures includes a porous, fluid-permeable, metallic support substrate, a membrane that is disposed on the support substrate and is selectively permeable to the fluid to be separated off, and a connecting part which is formed, at least on the surface, of a fluid-tight, metallic material. The support substrate is cohesively bonded along a peripheral section thereof to the connecting part. A ceramic, fluid-permeable, porous, first intermediate layer is disposed between the support substrate and the membrane. At least one ceramic bonding layer is disposed directly on the connecting part and the material bond and extends at least over the cohesive material bond and an adjoining section of the connecting part. The first intermediate layer ends on the bonding layer and has a greater average pore size than the bonding layer.

20 Claims, 3 Drawing Sheets

(51) Int. Cl.
*B01D 69/12* (2006.01)
*B01D 53/22* (2006.01)

(52) U.S. Cl.
CPC ........ *B01D 53/228* (2013.01); *B01D 2313/04* (2013.01); *B01D 2313/13* (2013.01)

(56) References Cited

U.S. PATENT DOCUMENTS

| | | | |
|---|---|---|---|
| 5,498,278 A * | 3/1996 | Edlund | B01D 53/22 55/524 |
| 5,518,530 A | 5/1996 | Sakai et al. | |
| 5,725,621 A * | 3/1998 | Pruette | B01D 46/0031 55/377 |
| 5,734,092 A * | 3/1998 | Wang | B01D 53/228 73/23.2 |
| 7,611,565 B1 * | 11/2009 | Paglieri | B01D 53/228 427/245 |
| 7,655,183 B2 * | 2/2010 | Benn | B01D 71/022 148/430 |
| 8,753,433 B2 | 6/2014 | Haring et al. | |
| 2003/0180711 A1 | 9/2003 | Turner et al. | |
| 2004/0237779 A1 * | 12/2004 | Ma | B01D 53/228 95/55 |
| 2006/0192107 A1 | 8/2006 | DeVoe et al. | |
| 2011/0042299 A1 | 2/2011 | Zhang et al. | |
| 2012/0060692 A1 | 3/2012 | Haring et al. | |
| 2019/0126206 A1 * | 5/2019 | Haydn | F16L 55/054 |

FOREIGN PATENT DOCUMENTS

| | | |
|---|---|---|
| JP | 2014046229 A | 3/2014 |
| WO | 2010099634 A1 | 9/2010 |
| WO | 2015070288 A1 | 5/2015 |

* cited by examiner

MEMBRANE ASSEMBLY WITH A BONDING LAYER

BACKGROUND OF THE INVENTION

Field of the Invention

The present invention relates to a membrane assembly for the permeative separation of a fluid from fluid mixtures, in particular of a gas from gas mixtures, comprising a porous, fluid-permeable, in particular gas-permeable, metallic support substrate, a membrane which is disposed on the support substrate and is selectively permeable to the fluid (in particular gas) to be separated off, a connecting part which consists at least on the surface of a fluid-tight (in particular gastight), metallic material, where the support substrate is cohesively bonded along a peripheral section thereof to the connecting part, and also comprising a ceramic, fluid-permeable (in particular gas-permeable), porous, first intermediate layer disposed between the support substrate and the membrane. The invention further relates to a process for producing such a membrane assembly.

Membrane assemblies of this type are used generally for the selective separation of a fluid (liquid, gas) from fluid mixtures, in particular for the selective separation of a gas from gas mixtures, in particular for the separation of hydrogen from hydrogen-containing gas mixtures (e.g. from steam-reformed natural gas). The term fluid here refers to a liquid, a gas or a mixture of a liquid and a gas. It is known that the property of particular materials of being only selectively permeable to particular atoms or molecules (e.g. $H_2$) can be exploited here by using them as thin sheet ("membrane"), for example as layer on a support or as free-standing film, for subdividing a fluid space (in particular gas space) for the fluid mixture from a fluid space (in particular gas space) for the fluid (in particular gas) to be separated off. If, for example, a gas mixture having a particular partial pressure of the gas to be separated off, e.g. having a particular $H_2$ partial pressure, is supplied to one side of the membrane, the atoms/molecules of the gas to be separated off try to get through the membrane to the other side until the same partial pressure of the gas to be separated off prevails on both sides. The membrane area can be assigned a specific gas flow of the gas to be separated off, in particular a specific $H_2$ gas flow, as a so-called performance parameter. It is generally true that the thinner the membrane and, at least in the case of metallic membranes, the higher the operating temperature, the higher is the specific gas flow of the gas to be separated off (e.g. $H_2$). Largely similar requirements apply when liquids are to be separated off. For this reason, there is a need to use very thin membranes in order to keep the plant as small as possible at a desired gas flow and thus reduce the plant costs. Since thin membranes in the region of a number of μm (microns) have very little shape stability and stiffness, they are frequently configured as layer on a porous, fluid-permeable (in particular gas-permeable), tubular or planar support substrate which ensures fluid supply (in particular gas supply) to and/or fluid transport (in particular gas transport) away from the membrane and provides an areal surface for application of the membrane. Metallic materials for the support substrate have, compared to ceramic materials, low production costs and are relatively simple to join to a metallic connecting part which is fluid-tight (in particular gastight) at least on the surface, e.g. by welding or soldering. In this way, the membrane assembly can be integrated via the connecting part into a module (having a plurality of membrane assemblies of this type) or more generally into a plant within which the fluid separation (in particular gas separation) is carried out. Between the support substrate and the membrane, there is a ceramic, fluid-permeable (in particular gas-permeable), porous, first intermediate layer which serves to avoid diffusion effects and in many cases also serves to effect a stepwise reduction in the pore size from the metallic support substrate to the membrane.

The transition from the porous support substrate via the material bond (e.g. welding seam) to the impermeable, metallic surface of the connecting part presents a great challenge in the application of the abovementioned layers. In this transition region, it is necessary to ensure a fluid-tight (in particular gastight) separation of the two fluid spaces (in particular gas spaces), at least insofar as the further fluids (in particular gases) present in the fluid mixture (in particular gas mixture) in addition to the fluid (in particular gas) to be separated off. However, this transition region represents the mechanical weak point because of the various material transitions and spalling of the layers continues to occur every now and again.

One variant for producing such an impermeable transition region is described in U.S. Pat. No. 8,753,433 B2. There, the membrane is drawn out from the support substrate to over the connecting part and ends directly on the latter. The intermediate layer provided between support substrate and membrane extends to over the joining region between support substrate and connecting part, but in the direction of the connecting part ends before the membrane. A membrane assembly in which an impermeable layer extends in the transition region over a porous, ceramic support substrate and a gastight, ceramic connecting part and on which the membrane runs along before ending is described in JP 2014-046229 A.

BRIEF SUMMARY OF THE INVENTION

It is an object of the present invention to provide a membrane assembly of the abovementioned type and a process for producing such a membrane assembly, in which the layer structure in the transition region between the support substrate and the connecting part remains joined over its area to the respective substrate over long periods of use.

The object is achieved by a membrane arrangement as claimed and by a process for producing a membrane arrangement as claimed. Advantageous developments of the invention are indicated in the dependent claims.

According to the present invention, a membrane assembly for the permeative separation of a fluid from fluid mixtures, in particular of a gas from gas mixtures (e.g. $H_2$ from $H_2$-containing gas mixtures) is provided (fluid separation membrane assembly, in particular gas separation membrane assembly). The membrane assembly comprises a porous, fluid-permeable (in particular gas-permeable), metallic support substrate, a permeable membrane (fluid separation membrane, in particular gas separation membrane) which is disposed on the support substrate and is selectively permeable to the fluid (in particular gas) to be separated off, a connecting part which consists at least on the surface of a fluid-tight (in particular gastight), metallic material, wherein the support substrate is cohesively bonded along a peripheral section thereof to the connecting part, and also a ceramic, fluid-permeable (in particular gas-permeable), porous, first intermediate layer disposed between the support substrate and the membrane. At least one ceramic bonding layer is disposed at least along a subsection of the total join length of the cohesive material bond directly on the connecting part and the material bond and extends at least over the material bond and an adjoining section of the connecting part. The first intermediate layer ends on or at the bonding layer and has a larger average pore size than the bonding layer. The various layers are distinguishable from one another in an electron micrograph of a transverse polished section with the aid of interfaces which are normally formed between them, which are particularly pronounced in the case of layers which have been sintered in a layerwise manner, and the different pore size. If reference is made in the present description and the claims to "directly" sequential layers/components, the presence of layers/components disposed between them is excluded. On the other hand, if the addition "directly" is not used, it is possible, insofar as it is technically feasible, for further layers/components to be provided inbetween. Where ranges are indicated, the indicated limit values are in each case intended to be included. The term "fluid" here refers to a liquid, a gas or a mixture of a liquid and a gas. The fluid is preferably in each case a gas, and fluid mixtures are in each case preferably gas mixtures. If reference is correspondingly made to a "fluid-tight" or "fluid-permeable" property, this is, according to a preferred development, in each case a "gastight" or "gas-permeable" Property, with this not being explicitly mentioned each time.

The structure of the membrane assembly claimed is associated with a number of advantages which will be explained below in terms of the function of the individual components. The term membrane refers to a thin sheet of a material which is selectively permeable to particular types of fluid, in particular types of gas (in particular to $H_2$). The membrane (of the material thereof) is selected according to the fluid, in particular gas (e.g. $H_2$), to be separated off. The further fluids (in particular gases) present in the respective fluid mixture (in particular gas mixture) may also optionally be taken into account in the design and selection of materials of the components of the membrane assembly, for example when a component has to be made fluid-tight (in particular gastight) to all of these fluids (in particular gases) of the fluid mixture (in particular gas mixture). The membrane can in principle be configured as free-standing film or as (at least one) layer on a support substrate. With a view to a very high performance parameter, a normally areal support substrate is used for the membrane in the membrane assembly of the invention in order to provide the membrane as thin layer thereon. The support substrate has to be porous and fluid-permeable so as to ensure fluid supply to or fluid transport away from the membrane, depending on the side of the membrane on which the support substrate is used (in the case of a tubular construction, preferably on the inside of the membrane). There are two customary basic shapes for the support substrate and accordingly also for the membrane applied thereto, namely a planar basic shape and a tubular basic shape, with the focus being increasingly on the tubular or tube-shaped basic shape. Both metallic and ceramic materials are used for the support substrate, with the metallic support substrate claimed here having the advantages over ceramic support substrates that it is cheaper to produce, easier to seal in the transition region to the connecting part and relatively simple to connect to the connecting part, for example by means of a welding process. The production of such porous, liquid-permeable, metallic support substrates is carried out, in particular, by means of a powder-metallurgical production process which comprises the steps of shaping (e.g. pressing) and sintering of metallic starting powders, as a result of which porous support substrates having a microstructure typical for powder-metallurgical production are obtained. This microstructure is distinguished by the individual grains of the metal powder being discernible, with these individual grains being joined, depending on the degree of sintering, by more or less strongly pronounced sinter necks (discernible, for example, from an electron micrograph of a polished section). However, porous, fluid-permeable, metallic support substrates, in particular support substrates of this type produced by powder metallurgy, have a relatively large pore size (sometimes up to 50 μm), which makes sealing with a membrane which typically has a thickness of only a few microns (thickness of gas separation membranes in the range, in particular, of 5-15 μm) more difficult. Suitable materials for the support substrate are, in particular, iron (Fe)-based (i.e. containing at least 50% by weight, in particular at least 70% by weight, of Fe) alloys containing a high proportion of chromium (chromium: Cr) (e.g. at least 16% by weight of Cr) to which further additives, e.g. yttrium oxide ($Y_2O_3$) (to increase the oxidation resistance), titanium (Ti) and molybdenum (Mo), can be added, with the total proportion of these additives preferably being less than 3% by weight (cf., for example, the material designated as ITM from Plansee SE containing 71.2% by weight of Fe, 26% by weight of Cr and a total of less than 3% by weight of Ti, $Y_2O_3$ and Mo). Furthermore, interdiffusion effects between the metallic support substrate and the membrane (which for the isolation of $H_2$ is normally likewise metallic) occur at high operating temperatures (typically operating temperatures in gas separation in the range of 450-900° C.) and these would lead over time to degradation or destruction of the membrane. To avoid these disadvantages, at least one ceramic, fluid-permeable, porous intermediate layer (e.g. composed of 8YSZ, i.e. zirconium oxide fully stabilized with 8 mol % of yttrium oxide ($Y_2O_3$)) is inserted between the support substrate and the membrane. This intermediate layer suppresses interdiffusion effects between the support substrate and the membrane. Furthermore, the pore size can be reduced to a few μm, in particular to an average pore size suitable for gas separation in the range of 0.03-0.50 μm by means of this intermediate layer, optionally also stepwise (in particular by application of a plurality of intermediate layers, i.e. by means of a "gradated layer structure"). The first intermediate layer (and optionally further intermediate layers) and the membrane preferably extend over the entire area of the support substrate provided for fluid separation (in particular gas separation). In the case of a tubular construction, this corresponds to the cylindrical outer surface (or optionally the cylindrical interior surface) of the support substrate, with at least one axial peripheral region optionally being able to be provided with a recess (e.g. for attachment of a connecting component or a sealing end). In the region of the layer structure, sealing (apart from permeability to the fluid to be separated off) occurs by means of the membrane. For the completely fluid-tight supply or discharge of the process fluids (in particular process gases), the layer structure has to be joined to appropriate connecting conduits of the plant (e.g. reactor). For such completely fluid-tight connection of the layer structure to connecting conduits, a connecting part which at least on the surface consists of a fluid-tight, metallic material is in the present case used directly adjoining the support substrate. The connecting part can also perform further functions, e.g. the combining or division of a plurality of connecting conduits. For this purpose, appropriately functionalized sections can be molded onto the connecting part and/or be joined to the latter. The support substrate is cohesively bonded (e.g. by means of a welded joint) along a peripheral section thereof to the connecting part. The fluid-tight, metallic region of the connecting part is preferably provided on the same side as the membrane on the adjoining support substrate, in the case of a tubular basic shape especially on the outside. In particular, the connecting part is a solid metallic component. In the case of a tubular construction, the connecting part is, at least in the region adjoining the support substrate, also tubular and the material bond extends around the total circumference of the adjoining components.

The transition region between the connecting part and the support substrate should be made fluid-tight (in particular gastight) at least for the further fluids or gases (hereinafter: "further fluids" in particular "further gases") present in the fluid mixture in addition to the fluid (in particular gas) to be separated off. For this purpose, it is possible, in particular, for the membrane itself, but as an alternative also a layer which is fluid-tight to the further or all fluids of the fluid mixture and joins or overlaps the membrane to be extended to over the connecting part in order then to end on the connecting part in a fluid-tight manner (for the further or all fluids of the fluid mixture). However, to suppress interdiffusion effects and to reduce the porosity, the first intermediate layer should also be extended in the direction of the connecting part at least to the end of the porous support substrate, preferably up to the adjoining region of the connecting part.

The invention is based on the recognition that the spalling of the layers which occurs in this transition region and leads to failure of the membrane assembly are attributable to the following causes: there is only unsatisfactory adhesion between the first intermediate layer and the fluid-tight, metallic material of the connecting part which is, in particular, made of a metallic solid material (e.g. steel). This also applies to the region of the material bond, which forms an unstable transition and is, particularly in the case of a welded seam, uneven. Furthermore, different coefficients of thermal expansion of the materials used for the connecting part, the support substrate and the ceramic intermediate layer lead to stresses within the layer structure, in particular during sintering of the layer structure or later during use of the membrane assembly. If cracks are formed within the first intermediate layer as a result or spalling occurs, these propagate through the further layers of the layer structure and lead to failure of the membrane assembly. In order to increase the adhesion of the first intermediate layer in this problematic transition region, at least one (in particular precisely one) ceramic bonding layer is applied directly to the connecting part and the material bond at least along a subsection of the total join length of the material bond, preferably over the entire join length. Based on the direction perpendicular to the material bond, which in the case of a tubular construction corresponds to the axial direction, the bonding layer extends at least over the material bond and an adjoining section of the connecting part. It has a smaller average pore size than the first intermediate layer which ends on the bonding layer. In this way, direct contact of the first intermediate layer with the problematic region of the material bond and of the connecting part is reduced, preferably even completely eliminated. As a result of the bonding layer being applied directly to the connecting part and the material bond underneath or directly next to the first intermediate layer, significantly better adhesion is achieved because of the lower porosity. This intermediate layer in the form of the bonding layer also reduces the stress caused by the different coefficients of thermal expansion. In particular in the case of sintering of the ceramic bonding layer, significant more sinter necks are formed between the relatively fine ceramic particles of this bonding layer and the underlying metallic surface (in particular of the material bond and of the connecting part) than would be the case between the metallic surface and the first intermediate layer. As a result, the adhesion of the bonding layer to the metallic surface is improved. As a result of two ceramic materials adhering relatively well to one another, in particular being able to be sintered well to one another, application of the first intermediate layer is unproblematical and likewise leads to good adhesion. The occurrence of spalling, both during sintering in the course of production and also in later use, was able to be avoided thereby. The first intermediate layer preferably extends in the direction of the connecting part at least to the end of the support substrate, optionally also to over the adjoining region of the connecting part, in order to provide a good substrate for the following layers which, particularly when they have a finer-grain structure than the first intermediate layer and the material of the support body, optionally could seep into the material of the support substrate. The first intermediate layer preferably ends on the bonding layer, i.e. so that, in the direction perpendicular to the layer surface (corresponds to the radial direction in the case of a tubular basic shape) an overlap region between the bonding layer and the first intermediate layer is formed (cf. FIG. 1, FIG. 3). However, it is also possible in principle for there to be no overlap region, or only a very small overlap region, as a result of the first intermediate layer not being drawn, or being drawn only to a very small extent, in the axial direction over the bonding layer, insofar as it directly adjoins the bonding layer (cf. FIG. 2).

In one embodiment, the average pore size of the bonding layer deviates by at least 0.10 μm, in particular by at least 0.15 μm, preferably even by at least 0.20 μm, from the average pore size of the first intermediate layer. The significantly finer-grain structure of the bonding layer resulting therefrom promotes particularly good adhesion thereof to the connecting part.

In one embodiment, the bonding layer is a sintered, ceramic layer. A ceramic, sintered layer displays a typical microstructure in which it is possible to discern the individual ceramic grains which are, depending on the degree of sintering, joined to one another by more or less strongly pronounced sinter necks (in the case of the present, ceramic, sintered layers, the sinter necks can also be only very weakly pronounced). The typical microstructure is, for example, discernable in an electron micrograph of a polished section. Due to the small particle size and pore size, many sinter necks are likewise formed from the bonding layer to the underlying metallic surface during the sintering operation, as a result of which adhesion between the layers is improved. This is particularly advantageous in the regions of the material bond and the adjoining connecting part which are prone to spalling. In one embodiment, the first first intermediate layer and optionally the further intermediate layers provided is/are each (a) sintered, ceramic layer(s). The individual ceramic layers, in particular the bonding layer and the at least one intermediate layer, are preferably each applied by means of a wet-chemical process (e.g. screenprinting, wet powder coating, dip coating, etc.), in particular by dip coating in the case of a tubular basic shape, and sintered in a layerwise manner. Layerwise sintering can, for example, be discerned in an electron micrograph of a polished section of the sintered layer structure by the interfaces between the individual layers being more pronounced than in the case of cosintering of all layers originally present in the green state, since in the latter production route the interfaces between the layers become more blurred owing due to diffusion effects.

In one embodiment, the bonding layer extends from the material bond directly on the support substrate to over a section of the support substrate adjoining the material bond. If the bonding layer extends from the material bond to both sides, i.e. to the side of the connecting part and also to the side of the support substrate, the instability in the region of the material bond in the direction of both sides is compensated for by creation of a largely continuous transition and a uniform substrate for the first intermediate layer is provided. As a result, the adhesion of the layer structure is improved and the risk of crack formation is reduced.

In one embodiment, the bonding layer extends from the material bond in the direction of the connecting part and/or in the direction of the support substrate in each case over a length in the range of 0.2-3.0 cm. This length, which in the case of a tubular or tube-shaped construction runs in the axial direction, is measured in the direction of the connecting part from the adjoining end in this direction of the material bond (which generally itself extends over a certain join length, cf. the region denoted by "d" in FIGS. 1-3) and in the direction of the support substrate from the end of the material bond which adjoins in this direction. In particular, this length is in each case in the range of 0.2-2.0 cm, even more preferably in the range of 0.3-1.0 cm. The further range and the narrow ranges are selected with a view to achieving firstly good adhesion between the layers and secondly for very effective exploitation of the available space for fluid separation (in particular gas separation).

In one embodiment, the bonding layer has a thickness in the range of 1-50 µm. In particular, the layer thickness is in the range of 2-20 µm, even more preferably in the range of 3-10 µm. Within the further range and in particular within the narrower ranges, firstly good adhesion of layers to the underlying components and also a good substrate for the first intermediate layer are provided, and secondly no excessively great unevenness is introduced by application of the bonding layer. It should be noted here that the layer thickness can vary, particularly in the region of the material bond (in the region of a welding seam, it can, for example, be thicker). Furthermore, it can become ever thinner in the direction of the peripheral region and end there and also seep into the region of the support substrate. A distance of 1 mm from the end of the material bond in the direction of the connecting part is therefore selected as reference for the layer thickness (i.e. in FIGS. 1-3 in each case displaced by 1 mm from the region denoted by "d" in the direction of the connecting part). From this distance on in the direction of the connecting part, the bonding layer preferably has a largely constant layer thickness until it then becomes thinner toward its end. In general, values given for layer thicknesses, values in respect of the pore size and values in respect of the particle size in each case relate to these parameters in the ready-to-use state, i.e. in the case of layers to be sintered, to the sintered state.

In one embodiment, the bonding layer is porous and fluid-permeable, in particular gas-permeable. As a result, fluid transport, in particular gas transport, to or from the membrane through the bonding layer is also made possible in the region of the bonding layer. The porosity of the bonding layer is preferably at least 20%, although the determination of the porosity suffers from a relatively large measurement error because of the small layer thickness and because of the usually angular shape of the individual ceramic particles. However, a porous and fluid-permeable bonding layer is not absolutely necessary. In particular, it can have small pores which in the embodiment explained below would correspond to an average pore length of 0 µm.

In one embodiment, the bonding layer has an average pore size in the range of 0-0.50 µm, in particular in the range of 0.01-0.30 µm, even more preferably in the range of 0.03-0.25 µm. In particular, the pore size distribution of the bonding layer is in the region of 0.01-10.00 µm. In one embodiment, the bonding layer has an average particle size in the range of 0.01-1.00 µm, in particular in the range of 0.01-0.75 µm, even more preferably in the range of 0.03-0.50 µm. In particular, the particle size distribution of the bonding layer is in the range of 0.01-25.00 µm. The further ranges for the average pore and particle sizes and also of the corresponding size distributions and in particular the narrower ranges are selected firstly so as to achieve good adhesion of the bonding layer to the substrate and secondly so as to produce a good transition to the first intermediate layer which ends thereon and has a larger average pore size and optionally a larger average particle size. The layer thickness of the first intermediate layer is, according to one embodiment, in the range of 5-120 µm, in particular in the range of 10-100 µm, even more preferably in the range of 20-80 µm. The layer thicknesses indicated for the first intermediate layer and the second intermediate layer mentioned below relate to the region of the support substrate having a largely constant layer thickness, while layer thickness fluctuations can occur in the transition region to the connecting part due to unevennesses.

The pore size or pore length of an individual pore is determined as follows: the area of the respective pore is measured in the polished section and the equivalent diameter thereof, which would be obtained in the case of a circular shape having the same area, is subsequently determined. The particle size is determined correspondingly. To determine the pore sizes and particle sizes, a cross section through the membrane assembly running perpendicular to the layer to be examined is produced and an appropriately prepared polished section is examined on a scanning electron microscope (SEM). The analysis is performed by means of the threshold value of the different shades of grey from the respective SEM-BSE image (BSE: back scattered electrons). Here, the brightness and contrast of the SEM-BSE image are set so that the pores and particles are easily recognizable and distinguishable from one another in the image. A suitable grey shade value is selected as threshold value by means of the slider control which differentiates between pores and particles as a function of shades of grey. To determine the average pore size, the pore size of all particles in a representative region of the layer concerned which was selected beforehand in the polished section is measured and the average is subsequently formed. The determination of the average particle size is carried out analogously. For the individual particle to be measured in each case, the geometric outline thereof is the determining factor rather than the grain boundaries of possibly a plurality of grains which are joined to form a particle and each have a different crystallographic orientation. Only the pores or particles which lie completely within the region selected are included in the evaluation. The porosity of a layer can be determined in the polished section (SEM-BSE image) by determining the area portion of the pores lying within a selected region relative to the total area of this selected region, with the area portions of the pores lying only partly within the selected region being included. In the present case, the program Imagic ImageAccess (version: 11 release 12.1) with the analysis module "Partikel Analyse" was used.

In one embodiment, the first intermediate layer has a smaller average pore size than the support substrate. According to one embodiment, the first intermediate layer has an average pore size in the range of 0.20-2.00 µm, in particular in the range of 0.31-1.20 µm, even more preferably in the range of 0.31-0.80 µm. In particular, the pore size distribution of the first intermediate layer is in the range of 0.01-25.0 µm. In one embodiment, the first intermediate layer has an average particle size in the range of 0.70-3.50 µm, in particular in the range of 0.76-2.50 µm, even more preferably in the range of 0.80-1.80 µm. In particular, the particle size distribution of the first intermediate layer is in the range of 0.01-100.00 µm. The porosity of the first intermediate layer is preferably at least 20%, with the determination of the porosity suffering from a relatively large measurement error because of the small layer thickness and because of the usually angular shape of the individual ceramic particles. As a result of the features mentioned, in each case either on their own or in combination, a stepwise reduction of the average pore size from the support substrate to the membrane is achieved.

In one embodiment, a ceramic, fluid-permeable, in particular gas-permeable, porous, second intermediate layer which has a smaller average pore size than the first intermediate layer extends between the first intermediate layer and the membrane. The provision of the second intermediate layer is advantageous in the case of, in particular, gas separation membrane assemblies, but in the case of the separation of liquids the second intermediate layer can in many cases be omitted. In one embodiment, the second intermediate layer has an average pore size in the range of 0.03-0.50 µm, in particular in the range of 0.03-0.30 µm, even more preferably in the range of 0.03-0.25 µm. In one embodiment, the second intermediate layer has an average particle size in the range of 0.01-1.00 µm, in particular in the range of 0.01-0.75 µm, even more preferably in the range of 0.03-0.50 µm. For the particle size distribution and the pore size distribution, the ranges indicated for the bonding layer are preferred. The layer thickness of the second intermediate layer is, according to one embodiment, in the range of 5-75 µm, in particular in the range of 5-50 µm, even more preferably in the range of 10-25 µm. The provision of the second intermediate layer having a reduced pore size and preferably a reduced particle size provides a sufficiently smooth surface for application of the membrane and likewise provides a diffusion barrier. Preference is given to the same starting material and the same sintering step being used for the second intermediate layer as for the bonding layer, so that the composition and microstructure thereof are the same as those of the bonding layer. In one embodiment, the second intermediate layer extends in the direction of the connecting part over the first intermediate layer. It can, in particular, end on the bonding layer or alternatively on the connecting part, to which it adheres similarly well as the bonding layer due to the comparable properties. In this way, a sufficiently smooth surface for application of the membrane is provided right through to the connecting part. In one embodiment, the membrane extends in the direction of the connecting part over and beyond the bonding layer and the at least one intermediate layer and ends directly on the connecting part. In this way, an arrangement which is fluid-tight at least in respect of the further fluids of the fluid mixture (in particular the further gases of the gas mixture) is achieved in the transition region. In general, the second intermediate layer can directly adjoin the membrane. However, as an alternative, one or more further, ceramic, fluid-permeable (in particular gas-permeable), porous intermediate layer(s) can be provided between the second intermediate layer and the membrane, wherein the average pore size of these further intermediate layer(s) then preferably decreases further from the second intermediate layer to the membrane.

In one embodiment, the materials of the bonding layer and of the at least one intermediate layer are selected from the group consisting of the following materials:

a. zirconium oxide ($ZrO_2$) stabilized with yttrium oxide ($Y_2O_3$),
b. zirconium oxide ($ZrO_2$) stabilized with calcium oxide (CaO),
c. zirconium oxide ($ZrO_2$) stabilized with magnesium oxide (MgO), and
d. aluminum oxide ($Al_2O_3$).

Preference is given to a zirconium oxide stabilized with yttrium oxide (YSZ for short), in particular a zirconium oxide fully stabilized with 8 mol % of yttrium oxide ($Y_2O_3$) (8YSZ for short). In one embodiment, the bonding layer and the at least one intermediate layer are made of one and the same material (or composition). In this way, comparable coefficients of thermal expansion are achieved and inexpensive production is made possible. YSZ, in particular 8YSZ, is preferred here. However, the individual layers, in particular the bonding layer and the second intermediate layer on the one hand and the first intermediate layer on the other hand can differ in terms of their microstructure, for example in respect of the average pore size, the average particle size and the porosity. Partially stabilized zirconium oxide (e.g. addition of typically 3 mol % of yttrium oxide when $Y_2O_3$ is employed as stabilizer) can also be used instead of fully stabilized zirconium oxide (e.g. addition of typically 8 mol % of yttrium oxide when $Y_2O_3$ is employed as stabilizer). Further possible stabilizers for zirconium oxide are cerium oxide ($CeO_2$), scandium oxide ($ScO_3$) or ytterbium oxide ($YbO_3$).

In one embodiment, the support substrate and the connecting part are each tube-shaped or tubular. The cross section thereof is preferably circular with a constant diameter along the axial direction. However, as an alternative, a differently closed cross section, for example an oval cross section, or a cross section which widens along the axial direction can also be provided. The material bond can in principle be formed by an integral construction of the connecting part and the support substrate, by means of a soldered joint or by means of a welded join. In one embodiment, the material bond is formed by a welded join which in the case of a tubular basic shape preferably extends around the entire circumference of the respective tubular peripheral section. A welded join can be produced inexpensively and reliably. Owing to the porosity of the support substrate, a depression is typically formed in the region of the welded join.

In the case of the isolation of hydrogen, pure metals which have a certain permeability to hydrogen but form a barrier to other atoms/molecules are in principle well suited as materials for the membrane. With a view to avoiding formation of an oxide layer which would impair this selective permeability, preference is given to using noble metals, in particular palladium, palladium-containing allows (especially with more than 50% by weight of palladium), e.g. palladium-vanadium, palladium-gold, palladium-silver, palladium-copper, palladium-ruthenium, or else palladium-containing composite membranes, e.g. having the layer sequence palladium, vanadium, palladium, for the isolation of hydrogen ($H_2$). In one embodiment, the membrane is accordingly made of palladium or a palladium-based, metallic material (e.g. alloy, composite, etc.). The Pd content of such membranes is, in particular, at least 50% by weight, preferably at least 80% by weight. Preference is also given to the bonding layer and/or the at least one intermediate layer being made of zirconium oxide ($ZrO_2$) stabilized with yttrium oxide ($Y_2O_3$), in particular of 8YSZ. Preference is also given to the support substrate and the connecting part each being made of iron-based materials. These features of the various components are each in themselves advantageous, and in combination they display in particular advantageous effects.

The present invention further provides a process for producing a membrane assembly for the permeative separation of a fluid from fluid mixtures, in particular of a gas from gas mixtures, especially for the separation of $H_2$ from $H_2$-containing gas mixtures, which comprises a porous, fluid-permeable (in particular gas-permeable), metallic support substrate and a connecting part which consists at least on the surface of a fluid-tight (in particular gastight), metallic material, where the support substrate is cohesively bonded along a peripheral section thereof to the connecting part. The process comprises the following steps:
  a. Application of at least one ceramic bonding layer directly to the material bond and directly to an adjoining section of the connecting part along at least a subsection of the total join length of the material bond;
  b. Gradual application of at least one ceramic, fluid-permeable (in particular gas-permeable), porous intermediate layer to the support substrate (and the overlapping region of the bonding layer), where the intermediate layer applied directly to the support substrate ends on or at the bonding layer and has a larger average pore size than the bonding layer, and a membrane which is selectively permeable to the fluid (in particular gas) to be separated off to the at least one intermediate layer.

Essentially the same advantages as in the case of the above-described membrane assembly according to the invention are achieved by the process of the invention. The above-described embodiments and variants are accordingly also able to be realized in the case of the process of the invention with achievement of corresponding advantages. In the case of the bonding layer and the at least one intermediate layer, the application comprises, in particular, applying the layer containing an organic binder and ceramic particles by means of a wet-chemical process and then sintering this layer and applying the next layer thereto only subsequently (optionally in a corresponding way).

Further advantages and useful aspects of the invention can be derived from the following description of working examples with reference to the accompanying figures.

DESCRIPTION OF THE INVENTION

Figure 1:
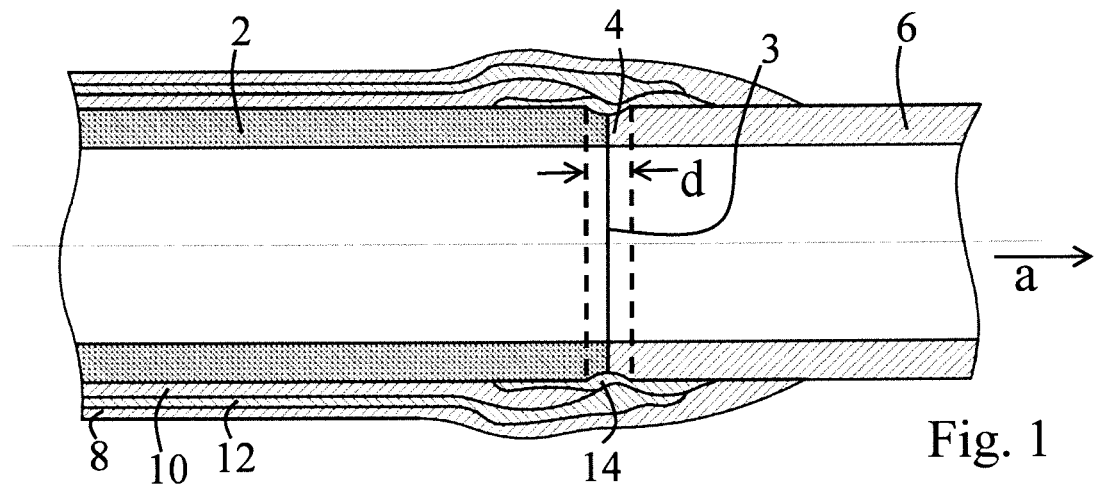
FIG. 1: a schematic cross-sectional view of a membrane assembly according to the invention in the axial direction according to a first embodiment of the invention.
Figure 2:
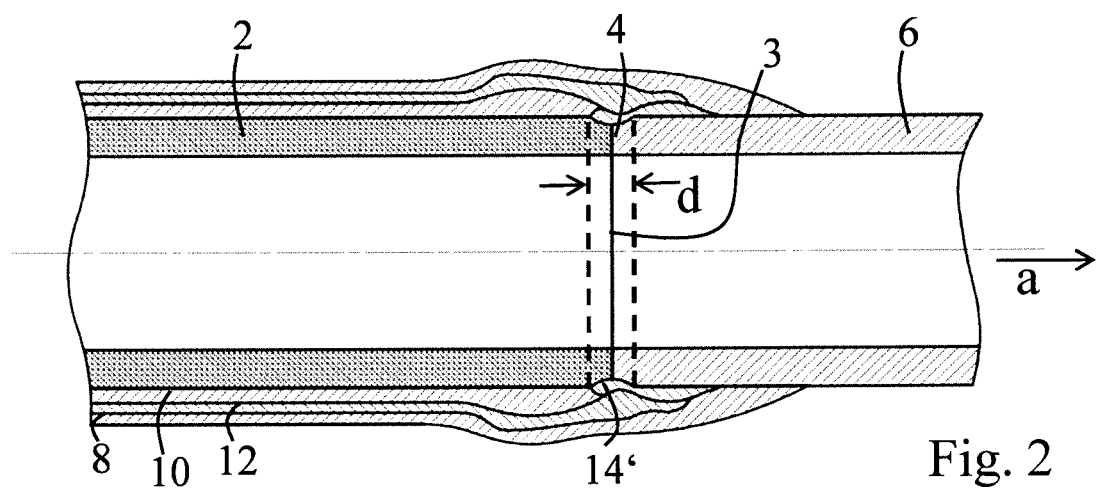
FIG. 2: a schematic cross-sectional view of a membrane assembly according to the invention in the axial direction according to a second embodiment of the invention.
Figure 3:
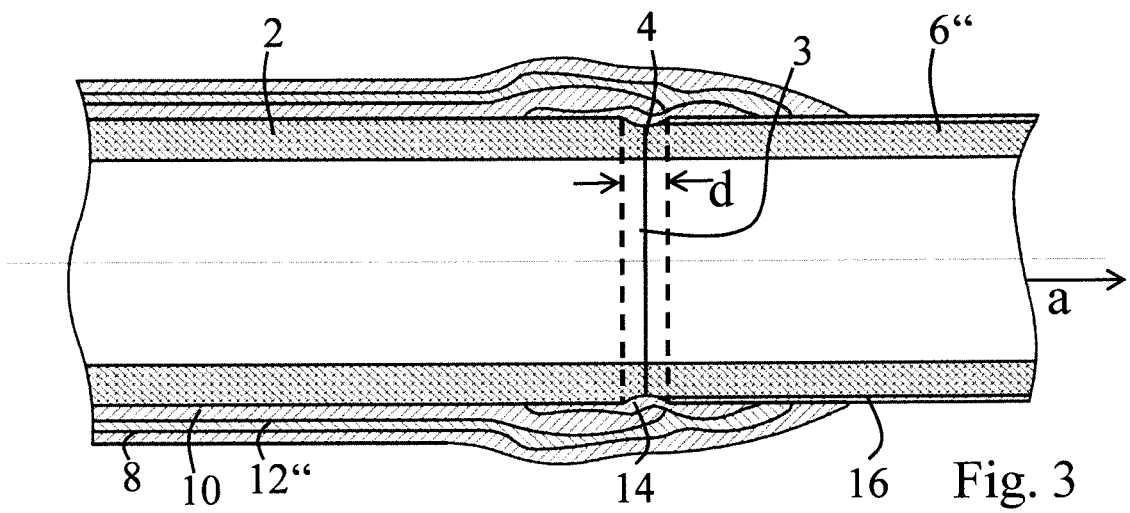
FIG. 3: a schematic cross-sectional view of a membrane assembly according to the invention in the axial direction according to a third embodiment of the invention.

FIGS. 1-3 show various embodiments, which differ from one another in terms of structure, of a membrane assembly for the permeative separation of a gas to be separated off (e.g. $H_2$) from a gas mixture (e.g. steam-reformed natural gas containing $CH_4$, $H_2O$, $CO_2$, CO, $H_2$, etc.), with in each case only the transition region from the support substrate to the connecting part being depicted. In FIG. 1, a tubular, porous, gas-permeable, metallic support substrate 2 (e.g. composed of ITM) is joined along its (circular) peripheral section 3 via an material bond 4, which in the present case is formed by a welded join, to a tubular connecting part 6 whose solid material is composed of a metal (e.g. steel). The welded seam of the material bond 4 forms a circumferential depression which extends in the axial direction a over a length d. A membrane 8 (e.g. composed of Pd) which is selectively permeable to the gas to be separated off extends over the region of the support substrate (with the exception of an optionally recessed peripheral region at the distal end (not shown) of the support substrate 2). A first ceramic, gas-permeable, porous intermediate layer 10 (e.g. composed of sintered 8YSZ) and a second ceramic, gas-permeable, porous intermediate layer 12 (e.g. composed of sintered 8YSZ) extend between the support substrate 2 and the membrane 8. In a region at a distance from the material bond 4, the first intermediate layer 10 directly adjoins the support substrate 2 and has a smaller average pore size than the support substrate 2. In this region, the second intermediate layer 12 directly adjoins the first intermediate layer 10 and on its other side directly adjoins the membrane 8. It has a smaller average pore size than the first intermediate layer 10. In the region of the material bond 4, a ceramic bonding layer 14 (e.g. composed of sintered 8YSZ) is present directly on the connecting part 6 and the material bond 4 and this ceramic bonding layer extends at least over the material bond 4 and an adjoining section of the connecting part 6, with the first intermediate layer 10 ending on the bonding layer 14. In the first embodiment, the bonding layer 14 extends from the material bond 4 also over an adjoining section of the support substrate 2 (as a deviation from the schematic depiction, it can also have seeped into the pores in the region of the support substrate 2). The bonding layer 14 is in the present case porous and gas-permeable and extends over the entire (circular) join length of the material bond 4 (and also the adjoining regions of the support substrate 2 and of the connecting part 6). The second intermediate layer 12 extends in the direction of the connecting part 6 and and beyond the first intermediate layer 10, so that a sufficiently smooth substrate for the membrane 8 is provided. The second intermediate layer 12 likewise ends on the bonding layer 14, with the bonding layer 14 also providing, because of its reduced average pore length compared to the first intermediate layer 10, a sufficiently smooth surface for the membrane 8. The membrane 8 extends in the direction of the connecting part 6 over and beyond the bonding layer 14 (and the two intermediate layers 10 and 12) and ends directly on the connecting part 6, with which it forms a join which is gastight for the gas (e.g. $H_2$) to be separated off.

In the following description of the second and third embodiments shown in FIGS. 2 and 3, the same reference numerals are used for the same components. Only the differences from the first embodiment will be discussed in detail here. In the second embodiment (FIG. 2), the bonding layer 14' extends only over the material bond 4 and an adjoining section of the connecting part 6 (over the entire join length of the material bond 4). Up to the beginning of the material bond 4, the first intermediate layer 10 thus extends directly on the support substrate 2, to which it adheres relatively well. In the third embodiment (FIG. 3), the connecting part 6" is made of a porous, gas-permeable base material, in particular the same material as the support substrate 2 (e.g. ITM), and has a gastight surface region 16 only on its exterior surface. The gastight surface region 16 can have been produced, for example, by application of a coating or a sealing composition or by surface melting of the porous base material of the connecting part 6". Furthermore, the third embodiment differs from the first embodiment in that the second intermediate layer 12" extends over and beyond the bonding layer 14 and ends on the connecting part 6".

Figure 4:
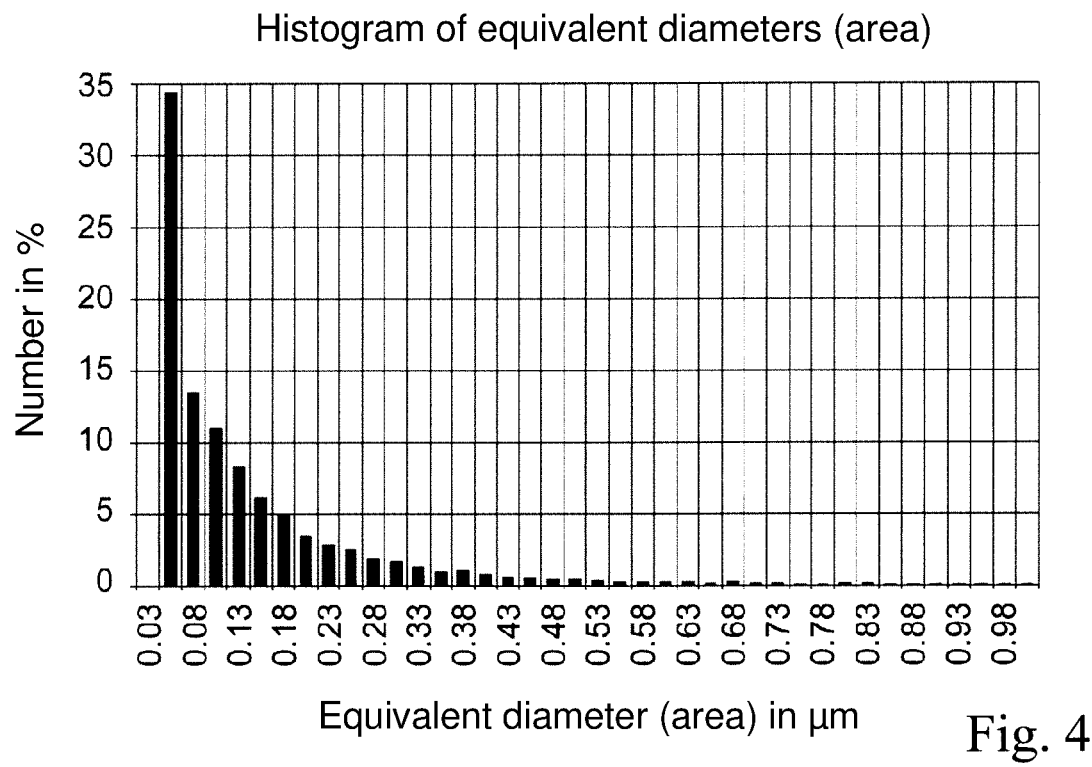
FIG. 4: pore size distribution of the bonding layer according to one embodiment of the invention.
Figure 5:
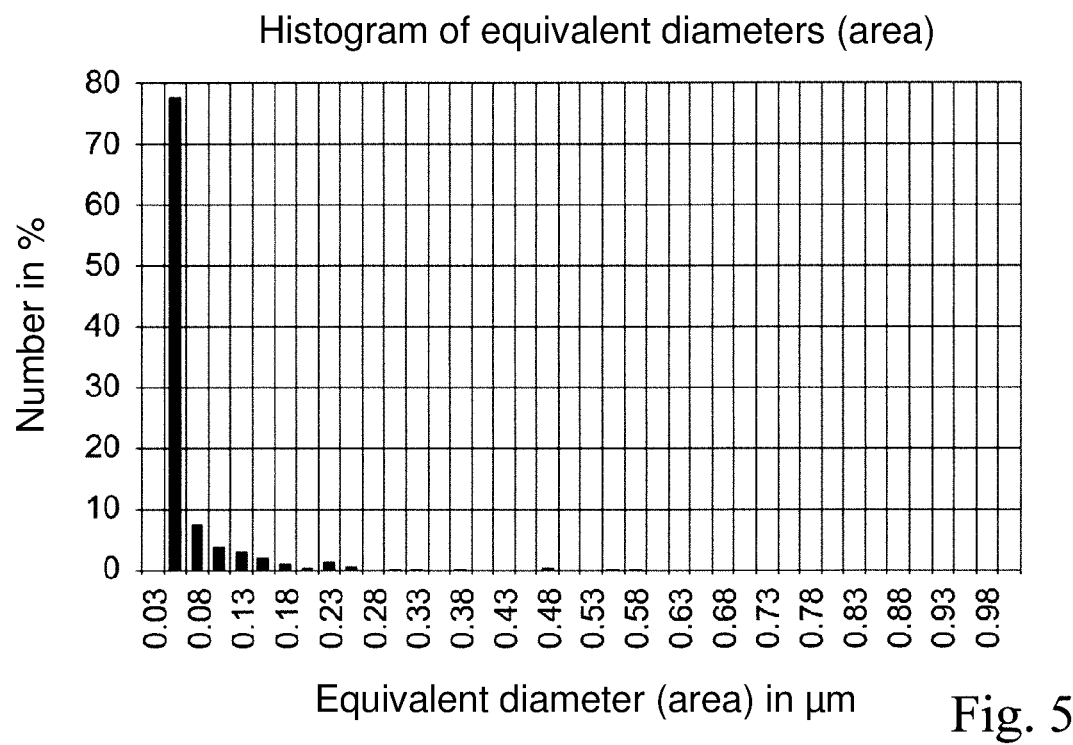
FIG. 5: particle size distribution of the bonding layer according to one embodiment of the invention.
Figure 6:
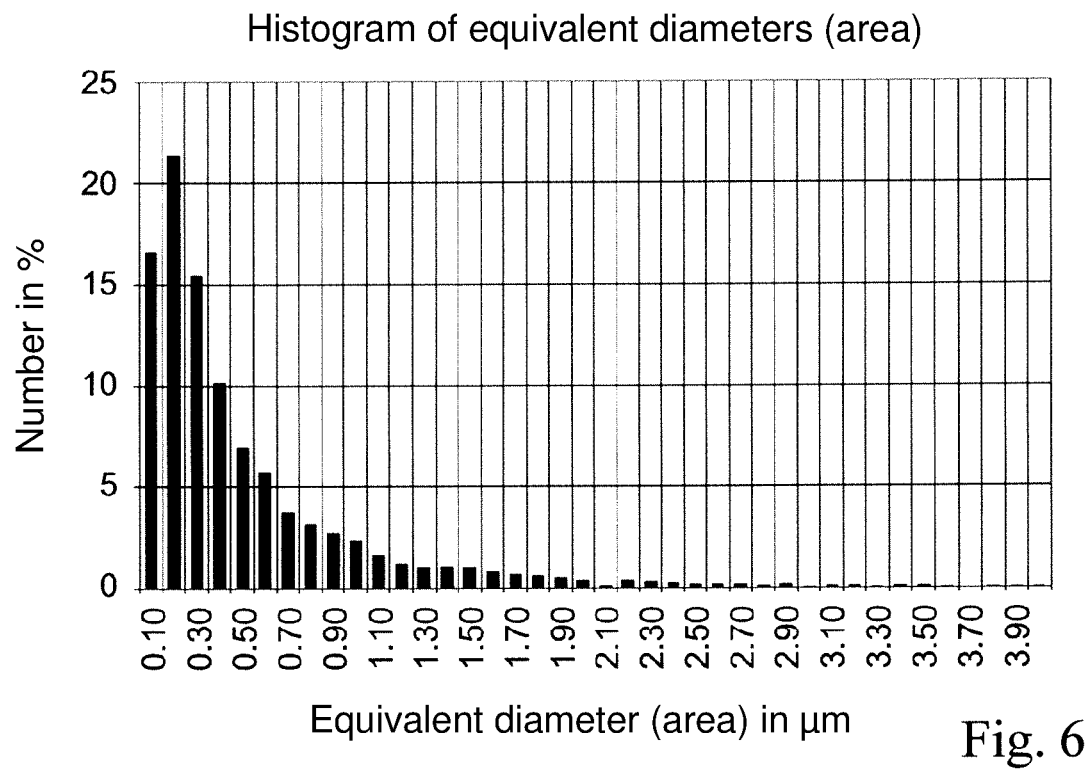
FIG. 6: pore size distribution of the first intermediate layer according to one embodiment of the invention.
Figure 7:
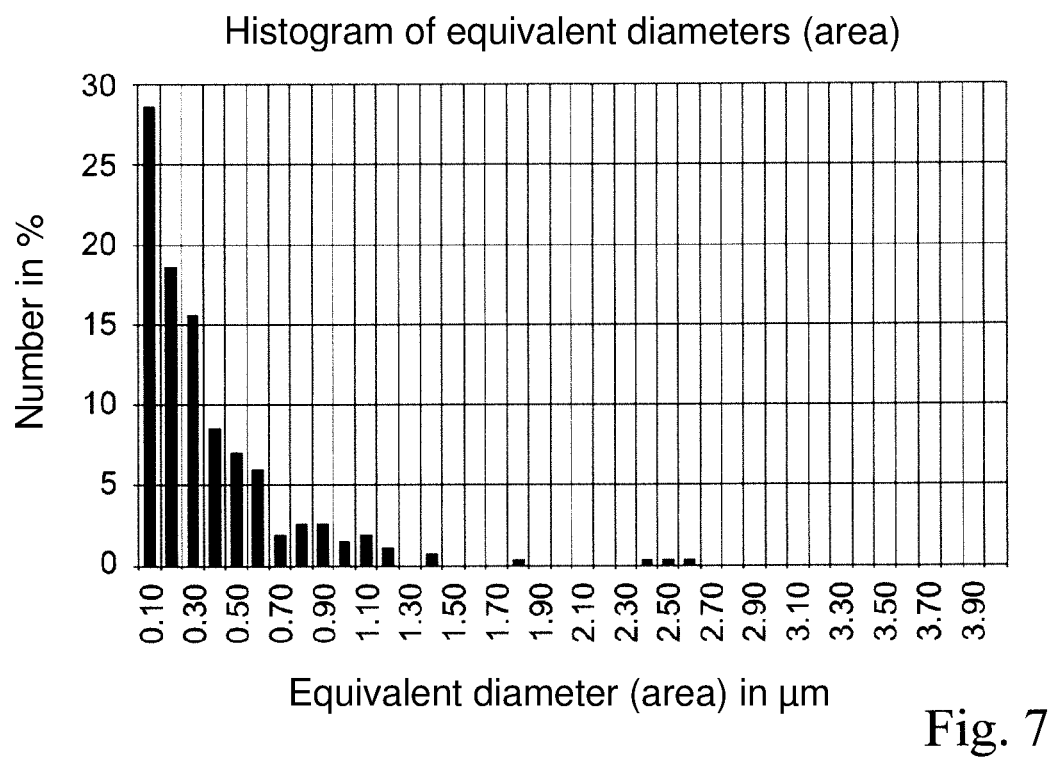
FIG. 7: particle size distribution of the first intermediate layer according to one embodiment of the invention.

An example of the production of a membrane assembly according to the invention will be described below. A support substrate in the form of a porous tube made of ITM and having an external diameter of 6 mm, a length of 200 mm, a porosity of about 40% and an average pore size of <50 µm is welded at an axial end thereof to a tubular connecting part whose solid material is composed of steel and has the same external diameter by laser welding. In order to ensure homogenization of the welded transition, the component obtained is heat-treated at a temperature of 1200° C. in a hydrogen atmosphere. The surface in the region of the welded join is subsequently sandblasted in order to achieve a more uniform surface. Next, the bonding layer is applied in the region of the welded join. For this purpose, a suspension which is suitable for a wet-chemical coating process and is derived from two 8YSZ powders having differing particle sizes, in particular one powder having a d80 of about 2 µm (and a d50 of about 1 µm) and a very fine powder having a particle size (crystallite size) of about 25 nm (nanometers), for example with addition of dispersants, solvents (e.g. BCA [2-(2-butoxyethoxy)ethyl] acetate, obtainable from Merck KGaA Darmstadt) and binder is produced. The bonding layer is brushed onto the welded join and onto the adjoining regions of the support substrate and around the connecting part. The welded seam is disposed in the middle of the bonding layer extending around the entire circumference and the width of the layer extends in each case 1 cm from the respective end of the welded seam in the direction of the connecting part and in the direction of the support substrate. The component obtained is subsequently sintered at a temperature of 1200° C. in a hydrogen atmosphere, as a result of which the organic constituents are burned out, sintering of the ceramic layer takes place and the porous, sintered, ceramic bonding layer is obtained. A typical pore size distribution and particle size distribution of a bonding layer produced in this way is shown in FIGS. 4 and 5. In particular, the pore size distribution is in the range from 0.03 to 5.72 µm (with an average pore size of 0.13 µm), as can be seen from FIG. 4 (in which a few pores having a greater diameter are no longer shown), and the particle size distribution is in the range of 0.03-18.87 µm (with an average particle size of 0.24 µm), as can be seen from FIG. 5 (in which a few particles having a larger diameter are no longer shown). In a next step, a suspension of 8YSZ powder is again produced for the first intermediate layer, with the data indicated above for the bonding layer applying analogously except that an overall coarser 8YSZ powder is used and a somewhat higher viscosity of the suspension than in the case of the bonding layer is set. In particular, an 8YSZ powder having a d80 of about 2 µm (and a d50 of about 1 µm) is used exclusively as ceramic powder. The first intermediate layer is applied by dip coating, i.e. by dipping the tubular component into the suspension, and ends on the bonding layer. The component obtained is subsequently sintered at a temperature of 1300° C. in a hydrogen atmosphere, as a result of which the organic constituents are burned out, sintering of the ceramic layer takes place and the porous, sintered, ceramic first intermediate layer is obtained. A typical pore size distribution and particle size distribution of a first intermediate layer produced in this way is shown in FIGS. 6 and 7. In particular, the pore size distribution is in the range from 0.08 to 12.87 µm (with an average pore size of 0.55 µm), as can be seen from FIG. 6 (in which a few pores having a larger diameter are no longer shown), and the particle size distribution is in the range from 0.08 to 61.37 µm (with an average particle size of 1.27 µm), as can be seen from FIG. 7 (in which a few particles having a larger diameter are no longer shown). For the second intermediate layer to be applied subsequently, the same suspension as for the bonding layer is used and is applied by dip coating. The second intermediate layer completely covers the first intermediate layer. The component obtained is subsequently sintered at a temperature of 1200° C. in a hydrogen atmosphere, as are result of which the organic constituents are burned out, sintering of the ceramic layer takes place and the porous, sintered, ceramic second intermediate layer is obtained. A Pd membrane is subsequently applied by means of a sputtering process. It completely covers the second intermediate layer and also the bonding layer and first intermediate layer disposed underneath. Finally, a further Pd layer is applied by an electrochemical process on top of the sputtered Pd layer in order to seal the latter and achieve the required gastightness.

The present invention is not restricted to the embodiments shown in the figures. In particular, the material bond does not necessarily have to be realized as a welded join. For example, it can also be in the form of a soldered join or a bond produced using an adhesive. Furthermore, the connecting part and the support substrate can also have an integral or monolithic structure and the material bond forms the transition between the gas-permeable support substrate and the connecting part which is gastight at least on its surface. For example, a monolithic configuration of the support substrate and the connecting part would also be possible in the third embodiment (FIG. 3). Furthermore, the structure described is suitable not only for separating off $H_2$ but also for separating off other gases (e.g. $CO_2$, $O_2$, etc.). It is also possible to use alternative membrane such as microporous, ceramic membranes ($Al_2O_3$, $ZrO_2$, $SiO_2$, $TiO_2$, zeolites, etc.) or dense, proton-conducting ceramics ($SrCeO_{3-\delta}$, $BaCeO_{3-\delta}$, etc.). The separation of liquids (e.g. alcohols from water-containing liquid mixtures, wastewater treatment, etc.) can be carried out using, inter alia, nanoporous membranes composed of carbon, zeolites, etc., as membranes.

The invention claimed is:
1. A membrane assembly for the permeative separation of a fluid from a fluid mixture, the membrane assembly comprising
   a porous, fluid-permeable, metallic support substrate;
   a membrane formed on said support substrate, said membrane being selectively permeable to the fluid to be separated off from the fluid mixture;

a connecting part formed, at least on a surface thereof, of a fluid-tight, metallic material, said support substrate having a peripheral section;

said connecting part being connected with a cohesive material bond to said peripheral section of said support substrate;

a ceramic, fluid-permeable, porous, intermediate layer disposed between said support substrate and said membrane; and at least one ceramic bonding layer disposed directly on said connecting part and on said cohesive material bond, at least along a partial segment of a total joining length of said material bond, and extending over said cohesive material bond and an adjoining section of said connecting part;

said intermediate layer terminating on or at said bonding layer and said intermediate layer having an average pore size greater than an average pore size of said bonding layer.

2. The membrane assembly according to claim 1, wherein the average pore size of said bonding layer deviates by at least 0.10 µm from the average pore size of said intermediate layer.

3. The membrane assembly according to claim 1, wherein one or both of said bonding layer and said intermediate layer is a sintered layer.

4. The membrane assembly according to claim 1, wherein said bonding layer extends from said material bond directly on said support substrate to over a section of said support substrate adjoining said material bond.

5. The membrane assembly according to claim 1, wherein said bonding layer extends from said material bond in a direction of said connecting part and in a direction of said support substrate in each case over a length in a range from 0.2 cm inclusive to 3.0 cm inclusive.

6. The membrane assembly according to claim 1, wherein said bonding layer has a thickness in a range from 1 µm inclusive to 50 µm inclusive.

7. The membrane assembly according to claim 1, wherein said bonding layer is porous and liquid-permeable.

8. The membrane assembly according to claim 7, wherein said bonding layer has pores with an average pore size up to 0.50 µm inclusive.

9. The membrane assembly according to claim 1, wherein an average pore size of said intermediate layer is smaller than an average pore size of said support substrate.

10. The membrane assembly according to claim 1, wherein said intermediate layer has an average pore size in a range from 0.20 µm inclusive to 2.00 µm inclusive.

11. The membrane assembly according to claim 1, wherein said intermediate layer is a first intermediate layer and further comprising a ceramic, fluid-permeable, porous, second intermediate layer, said second intermediate layer having an average pore size that is smaller than an average pore size of said first intermediate layer and said second intermediate layer extending between said first intermediate layer and said membrane.

12. The membrane assembly according to claim 11, wherein said second intermediate layer extends in the direction of said connecting part over said first intermediate layer.

13. The membrane assembly according to claim 11, wherein said membrane extends in a direction of said connecting part over said bonding layer and at least one of said first or second intermediate layers, and said membrane ends directly on said connecting part.

14. The membrane assembly according to claim 1, wherein said membrane extends in a direction of said connecting part over said bonding layer and said intermediate layer, and said membrane ends directly on said connecting part.

15. The membrane assembly according to claim 1, wherein a material of said bonding layer and a material of said intermediate layer are selected from the group consisting of:

zirconium oxide ($ZrO_2$) stabilized with yttrium oxide ($Y_2O_3$), zirconium oxide ($ZrO_2$) stabilized with calcium oxide (CaO), zirconium oxide ($ZrO_2$) stabilized with magnesium oxide (MgO), and aluminum oxide ($Al_2O_3$).

16. The membrane assembly according to claim 1, wherein said bonding layer and said intermediate layer are made of one and the same material.

17. The membrane assembly according to claim 1, wherein each of said support substrate and said connecting part is tubular.

18. The membrane assembly according to claim 1, wherein said cohesive material bond is a weld joint.

19. The membrane assembly according to claim 1, wherein:

said membrane is made of palladium or a palladium-based, metallic material;

at least one of said bonding layer or said intermediate layer is made of zirconium oxide ($ZrO_2$) stabilized with yttrium oxide ($Y_2O_3$); and each of said support substrate and said connecting part is made of an iron-based material.

20. A process for producing a membrane assembly for permeatively separating a fluid from a fluid mixture; the process comprising:

providing a porous; fluid-permeable, metallic support substrate and a connecting part formed, at least on a surface thereof of a fluid-tight, metallic material and connected to the support substrate, by way of a cohesive material bond along a peripheral section of the support substrate;

applying at least one ceramic bonding layer directly to the material bond and directly to an adjoining section of the connecting part along at least a subsection of a total joining length of the material bond;

gradually applying:

at least one ceramic, fluid-permeable, porous intermediate layer on the support substrate, with the intermediate layer applied directly to the support substrate ending on or at the bonding layer and having a greater average pore size than the bonding layer; and a membrane that is selectively permeable to the fluid to be separated from the fluid mixture to the at least one intermediate layer.

* * * * *